Patented Aug. 26, 1952

2,608,592

UNITED STATES PATENT OFFICE 2,608,592

CHLORINATION WITH LIQUID CHLORINE OF AROMATIC COMPOUNDS CONTAINING AN ALKYL SIDE CHAIN

Francis Earl Lawlor and Maynard B. Brodbeck, Niagara Falls, N. Y., assignors to Niagara Alkali Company, New York, N. Y., a corporation of New York No Drawing. Application December 24, 1948, Serial No. 67,244

9 Claims. (Cl. 260—651)

This invention relates to a process of chlorinating aromatic compounds having a side chain to form compounds in which all of the chlorine-replaceable nuclear hydrogen is replaced by chlorine, and hydrogen of the side chain also is substituted by chlorine, in which process the chlorination is accomplished by liquid chlorine in the presence of a chloride chlorination catalyst.

The usual method of producing compounds of the above-mentioned type is to complete the chlorination in the nucleus, and then to react the nuclear chlorinated compound with gaseous chlorine at a temperature at which the compound is maintained in a liquid state. By this method it is difficult to chlorinate the side chain of the aromatic compounds without resorting to high temperatures and other inconvenient operating conditions, and these high temperatures cause side reactions which usually decompose the compound.

The above difficulties are typified by the production of pentachlorobenzyl chloride. When toluene is substitutively chlorinated in the nucleus to pentachlorotoluene, the latter has a high melting point (222–223° C.). In order to contact this material effectively with gaseous chlorine for the purpose of chlorinating the side chain it is necessary that the material be liquified. The use of high temperatures to melt the pentachlorotoluene introduces many side reactions, the most significant of which is the removal of the methyl side chain group.

In accordance with the proposals of Beilstein and Kuhlberg, Ann. 150:302–3 (1869), pentachlorobenzyl chloride is made by heating purified pentachlorotoluene to boiling and then passing in chlorine gas. No yields are reported, but repetition of this process has shown poor yields, probably because of the lability of the methyl group at the high temperature. In fact, it is difficult to obtain good yield of pentachlorotoluene by the usual gaseous chlorination of toluene, because the high temperature required to maintain the product liquid while the fifth chlorine atom is being substituted often results in the removal of the side chain; the usual attempts to chlorinate toluene completely are apt to yield hexachlorobenzene.

An alternative is to use a solvent such as carbon tetrachloride or sulphuryl chloride, but this is undesirable because of problems incident to the solvent recovery. In addition, carbon tetrachloride is a relatively poor solvent and sulphuryl chloride is very corrosive and requires special equipment.

Another alternative prior art process, referred to in the article mentioned above, is to use benzyl chloride as a starting material and chlorinate with iodine as a catalyst, isolate the tri- and tetrachlorobenzyl chlorides, and chlorinate these further with antimony chloride as a catalyst and fractionally distill the product and recrystallize it. This process requires a final temperature at least as great as the melting point of the final product and requires the separate preparation of the benzyl chloride as a starting material.

In contrast with this, by means of the invention, chlorine can be substituted in the side chain of pentachlorotoluene at temperatures as low as 60° C.; with xylene, chlorine can be substituted in a side chain at about the same temperatures. In addition, the same reaction mass resulting from the production of pentachlorotoluene can be used as a starting material, thus eliminating the separate preparation of a starting material by a different process.

It has been discovered, in accordance with the broadest aspect of the invention, that aromatic compounds with side chains which have been chlorinated to replace all of the chlorine-replaceable nuclear hydrogen may have at least a part of the side chain hydrogen substituted by chlorine, by dissolving said compound in liquid chlorine, and while maintaining the chlorine in a liquid state, subjecting the solution to reaction conditions, i. e., the use of suitable temperatures, and of a suitable chloride chlorinating catalyst. This process permits the use of relatively low temperatures, particularly as contrasted with the prior art temperatures, and results in good yields. The chlorination results from a substitution of chlorine for hydrogen in the side chain, which liberates hydrogen chloride. The reaction is exothermic, and may proceed until the desired extent of chlorination is obtained. The reaction may be stopped at any time by cooling the reaction vessel below the reaction temperature. After the reaction is terminated, the resulting chlorinated compound can be recovered by the evaporation of the liquid chlorine.

Our invention is based on the unobvious discovery that aromatic compounds having a side chain and all of the chlorine-replaceable nuclear hydrogen substituted by chlorine, can have at least a part of the side chain hydrogen replaced by chlorine, if liquid chlorine is used as the solvent and the chlorinating agent in the presence of a chloride chlorinating catalyst during the reaction.

The completely nuclear chlorinated compound in which side chain chlorination is accomplished in accordance with the invention, may be made by any known process. It is convenient to make it by chlorinating the side chain compound or a partially chlorinated side chain compound with liquid chlorine in the presence of a chloride chlorinating catalyst at a temperature that does not cause removal or chlorination of the side chain. Thus the reaction mixture from the nuclear substitution chlorination (liquid chlorine, the nuclear chlorinated side chain compound, and the chloride catalyst) can serve as the starting mixture, and the chlorine can be substituted in the side chain under appropriate reaction conditions. Pentachlorobenzyl chloride, for example, can be made from toluene by a continuous smooth process using the same reaction components (toluene and liquid chlorine) and the same catalyst and at relatively low temperatures throughout. This is particularly advantageous over the prior art processes because no intermediate removal of the chloride catalyst or other purification of the nuclear chlorinated compound is required. It is especially noteworthy that hydrogen in the side chain as well as in the aromatic nucleus is replaced by chlorine under a given set of reaction conditions when liquid chlorine is used in the presence of a chloride chlorinating catalyst; a result that is contrary to what might be expected from the knowledge of prior art gaseous chlorination processes as applied to the substitution chlorination of non-aromatic compounds or groups.

The liquid chlorine not only acts as the chlorinating agent but also functions as the solvent or medium for the reacting components and in most cases also for the chlorinated products. While it is not intended that the invention should be limited to any theory, it is believed that the solvent action of the liquid chlorine, which acts to bring a high concentration of chlorine into intimate contact with the aromatic compound, may be largely responsible for the desirable results obtained. Since the compound to be chlorinated is in solution in the chlorine, it is subjected to the highest possible concentration of chlorine. This is to be distinguished from the use of gaseous chlorine where the chlorine is in solution in the compound and the concentration of chlorine is limited by the solubility of chlorine in the compound.

In addition to the above desirable reaction, the invention also has other advantages which accrue from the use of liquid chlorine, more particularly the use of the same medium as the solvent and chlorinating agent, thus eliminating the need for a separate solvent; the elimination of pyrolytic decomposition in the highly chlorinated products by the use of lower temperatures and the resulting production of products of high purity; the enhanced contact of the chlorine with compound to be chlorinated with the chlorine, thus minimizing or eliminating prolonged agitation and long reaction times; the ability to use ordinary equipment since enamel and glass lined vessels can be avoided; the control of the reaction and the temperature through self-refrigeration by evaporation of the liquid chlorine solvent; the ability to use such vented gases in a separate prechlorination step to exhaust the chlorine from the hydrogen chloride by-product; the facility with which the process can be operated; and other advantages that will be apparent from a reading of the following description of suitable modes of practicing the invention.

In order that the nature of the reaction may be fully understood and distinguished from other chlorination reactions, it is believed desirable to point out that there are at least two general types of chlorination processes. In one such type of process, chlorine is added to unsaturated and aromatic compounds to convert the compound into a saturated compound. Examples are the conversion of olefins to chlorinated saturated hydrocarbons, the addition of chlorine to unsaturated side chains on aromatic compounds, and the conversion of aromatic hydrocarbons to chlorinated hydrocarbons of the alicyclic series. In this type of chlorination there is no formation of hydrogen chloride as a by-product. The reaction proceeds with relatively great ease and, in fact, one of the difficulties in many instances is to prevent it from proceeding too fast. The reaction of these unsaturated aliphatic and aromatic compounds involves considerations peculiar to this type of addition reaction, and the invention is to be distinguished therefrom.

The substitution chlorination process, on the other hand, in which the nuclear hydrogen of an aromatic compound is replaced by chlorine, or more particularly, the hydrogen of a side chain is replaced by chlorine, both with the formation of hydrogen chloride as a by-product, is an entirely different type of reaction and is to be distinguished from the addition type of chlorination. Even here the substitution of hydrogen attached to a carbon in an aliphatic type radical such as is present in the side chain involves different factors than the substitution of hydrogen attached to a nuclear aromatic carbon. Substitution chlorination of the side chain in accordance with the invention must not destroy the aromaticity of the compound or remove or affect the side chain other than chlorinating it, and for this reason is carried out with greater difficulty by the prior art processes.

The process of our invention may be carried out as a batch operation or as a continuous operation. In a batch type operation, the liquid chlorine, the catalyst, and the compound to be chlorinated may be added to the reactor in any sequence. Generally means are provided to assure a solution of the compound in the chlorine in a single homogeneous reaction phase. If the compound to be chlorinated is a solid, any expedient may be resorted to for facilitating the introduction of the solid into liquid chlorine, such as by agitation. To facilitate such a controlled introduction, if the compound to be chlorinated is solid, it may be melted, or it may be dissolved in a small amount of a solvent which may be recovered subsequently. The use of an inert solvent under such circumstances is not excluded provided the conditions are such as to maintain the chlorine in the liquid phase, so as to provide a homogeneous solution comprising the liquid chlorine and the compound to be chlorinated in which the liquid chlorine is the primary solvent. Most of the materials to be chlorinated are sufficiently soluble in liquid chlorine, so that in the preferred embodiment of the invention any solvent other than chlorine is avoided.

The reaction is started preferably by increasing the temperature. The reaction rate is reduced or controlled in most cases through cooling, as explained hereinafter.

In a continuous type process the stream of chlorine and the compound to be chlorinated may be metered into a reaction zone, the temperature of which may be controlled or varied, and then passed to a chlorine recovery zone.

The proportions of the compound to be chlorinated and the liquid chlorine can vary over a relatively wide range. It is important that the amount of chlorine be sufficient to dissolve at least a portion of the compound and to provide a liquid chlorine solution of the compound during the reaction. The amount of chlorine will always be more than the theoretical amount required for chlorination, i. e., more than enough to replace so much of the hydrogen in the side chain as desired. If the starting compound is not completely chlorinated in the nucleus and nuclear chlorination is contemplated as a preliminary step, the amount of starting chlorine must be in excess of the amount to complete this reaction also. It is preferred that the amount of chlorine be sufficient to dissolve all of the chlorinated compound obtained at the end of the reaction so that there is no precipitation of the chlorinated product until after the reaction is complete when the chlorine is evaporated for the purpose of recovering the chlorinated compound. Commercial economy suggests the use of the minimum amount of chlorine within the above range.

The reaction with liquid chlorine is carried out in the presence of a chloride chlorinating catalyst. It may be dissolved or suspended in the solution. The use of such a catalyst in effecting the substitution of chlorine for hydrogen attached to aliphatic carbon atoms in side chains is contrary to the usual procedures in the prior art. Inasmuch as a chloride catalyst can be used to substitute the hydrogen attached to nuclear carbons with chlorine to prepare the completely nuclear chlorinated starting material, it is particularly advantageous to be able to replace the side chain hydrogens without altering the reaction mixture. In actual practice the reaction to make pentachlorobenzyl chloride from toluene may appear as a single continuous process. As the temperature gradually rises through the relatively lower temperature range more of the nuclear hydrogen is replaced. At a higher temperature the side chain hydrogen is replaced by chlorine. This may be done without an abrupt transition. Alternatively both nuclear and side chain hydrogen may be replaced at the higher temperature. This similarity of reaction condition for two such different types of hydrogen replacement is believed novel and unusual in the chlorinating art.

Any of the usual chloride chlorinating catalysts may be employed, such as for instance iron chloride, antimony chloride, aluminum chloride, iodine chloride, and sulfur chloride, and aside from the fact that one catalyst may be somewhat better than another in certain reactions, the particular chloride catalyst is not critical. They are well known as a group as chloride chlorinating catalysts, and a further description of the constituents in the group is believed unnecessary in view of the knowledge in the art. Iron chloride is usually preferred due to its activity, cheapness and ease of preparation. In some instances elements may be used, such as iron or iodine, which combine with the liquid chlorine to form iron chloride, or iodine chloride, respectively. The amount of the catalyst need not be large and is generally a fraction of 1%.

The chlorination process of the invention is conducted at any temperature at which the desired reaction proceeds at a suitable rate, depending on the degree of chlorination wanted, provided that the temperature is sufficiently high to cause substitution of hydrogen in the side chain before the reaction is terminated. For many compounds a temperature within the range of −34° C. (b. p. of liquid chlorine) up to about 80° to 90° C. is satisfactory. If an entirely unchlorinated aromatic compound with a saturated aliphatic hydrocarbon side chain is to be chlorinated to make the completely nuclear chlorinated starting material, the first one or two chlorines can be substituted in the nucleus at the lower temperatures, the last nuclear chlorine introduced at the higher temperatures, and the side chain chlorine substituted at a still higher temperature.

Application Serial No. 64,046, filed December 7, 1948, describes and claims a process for the nuclear substitution chlorination of aromatic compounds, including those having a side chain, in the presence of a chloride chlorinating catalyst utilizing liquid chlorine under temperature conditions such that nuclear substitution chlorination is essentially the only reaction.

It appears that a reasonable rate of reaction requires a higher temperature as each additional chlorine is substituted, first on the nucleus and then on the side chain. Thus, for instance, the rate of reaction for substituting the fourth chlorine on the nucleus in toluene in preparing the starting material proceeds fairly rapidly at one temperature, but the reaction to substitute the fifth chlorine proceeds very slowly at this temperature. Upon elevating the temperature, the reaction to substitute the fifth chlorine proceeds at a reasonable rate, but the reaction to substitute the first chlorine in the side chain in accordance with the invention is slow. At a still higher temperature the side chain chlorination takes place. The final temperature must be high enough to accomplish side chain substitution.

In all instances the pressure must be such as to maintain the chlorine in the liquid phase at the temperature employed, but higher pressures, such as are obtained by an inert gas or with the hydrogen chloride by-product, are contemplated as within the invention.

At the conclusion of the reaction the chlorine may be separated, for example, it may be evaporated and condensed for reuse, and the chlorinated compound remains. Generally it is in sufficiently pure condition after the separation of the chlorine so as not to require further purification.

Hydrogen chloride is formed during the reaction and the pressure rises in the reaction vessel because the physical constants of hydrogen chloride are such that it is not condensed to a liquid under the usual reaction conditions, and it is not appreciably soluble in the reaction mixture or in liquid chlorine.

The reaction is exothermic and an increase in temperature and pressure may be prevented or readily controlled, by venting gas from the reaction. If the gas which is a mixture of hydrogen chloride and chlorine is passed through a reflux condenser before venting, a substantial part of the chlorine vapors can be condensed and returned to the reaction vessel. The vented gases will then comprise all of the hydrogen chloride, and a part or substantially none of the chlorine depending on the operation of the reflux condenser. The temperature may be varied during the chlorination, i. e., it may be raised as the reaction nears the end, for example, by applying heat to the reaction vessel by controlling the amount of evaporation and the operation of the reflux condenser.

The by-product hydrogen chloride containing some chlorine may be used, for example, in a counter-current process in which the vented gases containing hydrogen chloride and chlorine may be used to chlorinate an unchlorinated or lower chlorinated compound, such as toluene, for example, through the stage where chlorination readily proceeds with gaseous chlorine, as might be done in the first step of preparing the completely chlorinated starting material. In this way the chlorine is stripped from the hydrogen chloride by-product gas. The parially chlorinated compound is then treated with liquid chlorine in accordance with the invention, to complete the chlorination.

In the substitution chlorination of some aromatic compounds with side chains, the reaction to substitute the first chlorine in the nucleus proceeds very rapidly and this portion of the reaction, if it were convenient, could be carried out even with gaseous chlorine. The starting material may be partially nuclear chlorinated by means other than with the use of liquid chlorine and a chloride chlorinating catalyst and the nuclear chlorination carried further or completed with liquid chlorine to complete the preparation of the starting material. Thus, for instance, toluene may be chlorinated up to the di- or trichloro stage by any known process, but it should not be carried so far as to make the product too hard to handle in subsequent liquid chlorination. Alternatively, the di or tri product may be purchased as such and the chlorination completed with liquid chlorine and a chloride chlorinating catalyst. Our invention contemplates the chlorination with liquid chlorine of any completely nuclear chlorinated aromatic compound with a side chain, whether the nuclear chlorination is completed with liquid chlorine or not, and especially those starting materials which have been completely nuclear chlorinated with liquid chlorine and a chloride chlorinating catalyst at temperatures up to the temperatures of the side chain chlorination used in accordance with the invention.

The invention is applicable to completely nuclear chlorinated aromatic compounds having a side chain, which compounds may be mononuclear or may have two or more condensed or connected rings. All such compounds are liquids or solids under the temperature and pressure reaction conditions. The compounds may be nuclear chlorinated derivatives of all of the above types. Illustrative of the aromatic hydrocarbons that may be used are completely nuclear chlorinated toluene, xylene, ethylbenzene and cumene, durene and mesitylene. Other aromatic compounds which may be employed are those containing a hydroxy or carboxyl group, such as completely nuclear chlorinated cresol and toluic acid; compounds containing a nitro or sulfonic group such as nitrotoluene and tolyl sulfonic acid; and compounds containing other substituted groups. The invention is particularly applicable to mononuclear hydrocarbons having not more than two alkyl side chains of not more than four carbon atoms each, especially the completely chlorinated methyl benzenes.

The expression "completely" chlorinated as used herein refers to the substitution of as many nuclear hydrogens as is possible under the reaction conditions contemplated. In some instances, because of steric hindrance and the known directing effects of certain groups in an aromatic nucleus, it may not be possible to substitute all of the nuclear hydrogen, but when all of the chlorine-replaceable hydrogens are substituted the nuclear chlorination would be complete. The expression "fully" chlorinated as used herein refers to the substitution of all of the nuclear hydrogens. Thus pentachlorotoluene would be both completely and fully chlorinated. In the case of certain other aromatic compounds containing non-hydrocarbon groups in addition to the hydrocarbon side chain, it may not be possible to substitute all of the nuclear hydrogens under the reaction conditions. If only less than the total number can be substituted, but this is all that can be substituted, such a compound would be "completely" nuclear substitutively chlorinated.

In order to illustrate and point out some of the advantages of the invention, the following specific embodiments are included. These are for illustrative purposes only and are not to be construed as limitations on the invention as it is otherwise disclosed and claimed herein.

*Example 1*

(a) 407.5 g. (1.54 mols) of pentachlorotoluene and 2 g. anhydrous $FeCl_3$ were placed in the pressure reactor; 1290 g. (18.2 mols) liquid chlorine was added. The reactor was closed and the contents were heated to 60–69° C. for a period of 4½ hours at a pressure to keep the chlorine in the liquid phase at said temperature. The excess chlorine was evaporated and there was obtained crude pentachlorobenzyl chloride M. P. 97–102° C.

(b) In a reaction as in (a) above no anhydrous $FeCl_3$ was added and there was obtained only the recovered pentachlorotoluene, M. P. 218° C.

*Example 2*

385 g. (2 mols) trichlorotoluene and 12 g. anhydrous $FeCl_3$ were placed in a suitable pressure reactor equipped with a reflux condenser, thermometer well, pressure gauge and safety disc. The reactor and contents were cooled to 0° C. 1525 g. liquid chlorine was then added. A reaction evolving hydrogen chloride began almost immediately. The temperature gradually rose over a period of two hours to 60° C. under a pressure to maintain chlorine liquid at this temperature. After this the excess chlorine was vented off. The product was removed from the reactor, a portion was crystallized from toluene and washed with methanol. The dried product had a M. P. of 100–101°, total chlorine of 71.4%, and alkyl chlorine removed by alcoholic potash of 11.0%. (Theoretical for pentachlorobenzyl chloride M. P. 103° C., total chlorine: 71.2%, alkyl chlorine: 11.9%.) The crude yield was 91.3%.

*Example 3*

2250 g. liquid chlorine and 5 g. steel wool were placed in the pressure reactor equipped with a small pressure tank into which 432 g. trichlorotoluene was charged. The reactor and contents were heated to 60° C. and HCl was admitted to the small pressure tank to give 95 pounds per square inch more pressure than the reactor. The valve connecting the pressure tank to the reactor was then opened and the trichlorotoluene slowly admitted to the reactor. A reaction took place immediately and the hydrogen chloride gas was bled off continuously at a pressure to maintain chlorine liquid. The reaction was carried out at 60° C. for one hour after all the trichlorotoluene had been added; the chlorine solution of product was then discharged and the excess chlorine evaporated. The product which consists principally of pentachlorobenzyl chloride had a M. P. of 92–101° (pure 103°) chlorine analysis 71.5% (theoretical: 71.2%). Alkyl chlorine 11.95% (theoretical: 11.9%). The yield was almost quantitative.

Example 4

In a reaction similar to that in Example 2 trichlorotoluene (195.5 g. 1 mol) containing 1 g. dissolved iodine was added to 2300 g. liquid chlorine in the nickel reactor at a temperature of 68–70° and maintained at this temperature for two hours. The chlorine solution was discharged into a beaker and the excess chlorine evaporated. Upon crystallization from toluene a crop of pentachlorotoluene was obtained; the residue upon evaporation yielded pentachlorobenzyl chloride. Total chlorine: 69.9%; alkyl chlorine: 11.1%.

Example 5

212 g. (2 mols) p-xylene and 6 g. steel wool were placed in the nickel pressure reactor. Gaseous chlorine was passed in at 40–80° C. until the xylene had passed the dichloro stage. The reactor and contents were cooled to 4° C. and 2550 g. liquid chlorine was added. As the temperature was brought to about 15° C. the reaction started. The temperature was gradually increased over a period of two hours to 60° C. where it was maintained for 40 minutes under a pressure to maintain the chlorine liquid, after which the chlorine solution was discharged from the reactor and the excess chlorine evaporated. The pastelike product, which had no sharp melting point, gave a total chlorine analysis of 65.6% (theoretical for tetrachloroxylyl chloride: 63.8%; for tetrachloroxylene chloride: 68.0%). Chlorine removed by alcoholic potash 13.3% (theoretical for tetrachloroxylyl chloride: 12.8%; for tetrachloroxylylene chloride: 22.7%). The product, therefor, consists principally of tetrachloro-p-xylyl chloride.

Example 6

205 g. (1.5 mols) sec-butyl benzene and 4 g. iodine were placed in the nickel pressure reactor. Gaseous chlorine was passed in at 25–46° C. until the sec-butyl benzene had passed the trichloro stage as shown by the amount of hydrogen chloride evolved. The reactor and contents were then cooled to −6° C. and 2250 g. liquid chlorine added. The temperature was gradually increased over a period of 3¼ hours to 58° C. where it was maintained one hour under a pressure to maintain chlorine liquid. The contents were discharged and the excess chlorine evaporated. A small amount of solids was filtered off, leaving an amber oil, the analysis of which showed 61.4% total chlorine and 7.49% alkyl chlorine. The chlorine content of pentachlorobutyl benzene is 57.9% and that of chlorobutylpentachloro benzene is 62.5% with 10.4% alkyl. Therefore the product represents a mixture of 24% sec-butyl pentachlorobenzene and 76% sec-chloro butyl pentachlorobenzene.

In Examples 2 to 6, in which the starting compound is not completely chlorinated in the nucleus, the first portion of the liquid chlorine is utilized to substitutively chlorinate the nucleus, especially at the lower temperature at the beginning, following which the chlorination in the side chain takes place in accordance with the invention.

In view of the foregoing disclosures, variations and modifications thereof will be apparent to one skilled in the art. The invention contemplates all such modifications and variations as come within the scope of the appended claims.

We claim:

1. A process of substitution chlorination of a chlorine-soluble completely substitutively nuclear chlorinated aromatic compound having at least one alkyl side chain to replace side chain hydrogen with chlorine, which comprises reacting said compound with chlorine in solution in liquid chlorine functioning as a liquid solvent medium for the compound in the presence of a chloride chlorinating catalyst at a reaction temperature above the temperature at which said compound is completely substitutively nuclear chlorinated as essentially the only reaction under otherwise identical reaction conditions, said reaction temperature being one not above about 90° C. and at which the reaction proceeds to replace hydrogen with chlorine in the alkyl side chain as essentially the only reaction, and at a pressure to maintain the chlorine in a liquid state at said temperature.

2. A process of substitution chlorination of a chlorine-soluble completely substitutively nuclear chlorinated aromatic hydrocarbon compound having at least one alkyl side chain to replace side chain hydrogen with chlorine, which comprises reacting said compound with chlorine in solution in liquid chlorine functioning as a liquid solvent medium for the compound, in the presence of a chloride chlorinating catalyst at a reaction temperature above the temperature at which said compound is completely substitutively nuclear chlorinated as essentially the only reaction under otherwise identical reaction conditions, said reaction temperature being one not above about 90° C. and at which the reaction proceeds to replace hydrogen with chlorine in the alkyl side chain as essentially the only reaction, and at a pressure to maintain the chlorine in a liquid state at said temperature, and thereafter removing uncombined chlorine from the chlorinated compound.

3. A process of substitution chlorination of a chlorine-soluble completely substitutively nuclear chlorinated aromatic hydrocarbon compound having at least one alkyl side chain to replace side chain hydrogen with chlorine, which comprises reacting said compound with chlorine in solution in liquid chlorine functioning as a liquid solvent medium for the compound, in the presence of a metal chloride chlorinating catalyst, at a reaction temperature above the temperature at which said compound is completely substitutively nuclear chlorinated as essentially the only reaction under otherwise identical reaction conditions, said reaction temperature being one not above about 90° C. and at which the reaction proceeds to replace hydrogen with chlorine in the alkyl side chain as essentially the only reaction, and at a pressure to maintain the chlorine in a liquid state at said temperature, venting gaseous hydrogen chloride from the reaction mass while maintaining a pressure to keep the chlorine in the liquid state at the temperature maintained, continuing the reaction with the liquid chlorine until the evolution of hydrogen chloride substantially ceases at the temperature maintained, and thereafter removing uncombined chlorine from the chlorinated compound.

4. A process of substitution chlorination of a chlorine-soluble completely substitutively nuclear chlorinated mono-nuclear aromatic hydrocarbon compound having at least one methyl side group to replace hydrogen of the methyl group with chlorine, which comprises reacting said compound with chlorine in solution in liquid chlorine functioning as a liquid solvent medium for the compound, in the presence of a chloride chlorinating catalyst, at a reaction temperature above the temperature at which said compound is completely substitutively nuclear chlorinated as essentially the only reaction under otherwise identical reaction conditions, said reaction temperature being one not above about 90° C. and at which the reaction proceeds to replace hydrogen with chlorine in the methyl group as essentially the only reaction, and at a pressure to maintain the chlorine in a liquid state at said temperature, and thereafter removing uncombined chlorine from the chlorinated compound.

5. A process of side chain substitution chlorinating pentachlorotoluene, which comprises reacting pentachlorotoluene with chlorine in solution in liquid chlorine functioning as a liquid solvent medium for the pentachlorotoluene, in the presence of a chloride chlorinating catalyst, at a reaction temperature above the temperature at which the pentachlorotoluene is formed as essentially the only reaction under otherwise identical reaction conditions, said reaction temperature being one not above about 90° C. and at which the reaction proceeds to replace hydrogen with chlorine in the methyl group of the pentachlorotoluene as essentially the only reaction, and at a pressure to maintain the chlorine in a liquid state at said temperature, and thereafter removing uncombined chlorine from the chlorinated compound.

6. A process of forming pentachlorobenzyl chloride, which comprises reacting pentachlorotoluene with chlorine in solution in liquid chlorine functioning as a liquid solvent medium for the pentachlorotoluene in the presence of anhydrous ferric chloride as a catalyst at a reaction temperature above the temperature at which pentachlorotoluene is formed as essentially the only reaction under otherwise identical reaction conditions, said reaction temperature being one not above about 80° C. and at which the reaction proceeds to replace one of the hydrogens of the methyl group of the pentachlorotoluene with chlorine as essentially the only reaction, and at a pressure to maintain the chlorine in a liquid state at said temperature, venting gaseous hydrogen chloride from the reaction mass while maintaining a pressure to keep the chlorine in the liquid state at the temperature maintained, continuing the reaction with the liquid chlorine until the evolution of hydrogen chloride substantially ceases at the temperature maintained, and thereafter removing uncombined chlorine from the chlorinated compound.

7. A process of forming pentachlorobenzyl chloride which comprises reacting pentachlorotoluene with chlorine in solution in liquid chlorine functioning as a liquid solvent medium for the pentachlorotoluene in the presence of a chloride chlorinating catalyst at a reaction temperature above the temperature at which pentachlorotoluene is formed as essentially the only reaction under otherwise identical reaction conditions, said reaction temperature being one not above about 80° C. at which the reaction proceeds to replace one of the hydrogens of the methyl group of the pentachlorotoluene with chlorine as essentially the only reaction, and at a pressure to maintain the chlorine in a liquid state at said temperature.

8. A process of substitution chlorination of a chlorine-soluble completely substitutively nuclear chlorinated aromatic compound having at least one alkyl side chain to replace side chain hydrogen with chlorine, which comprises reacting said compound with chlorine in solution in liquid chlorine functioning as a liquid solvent medium for the compound in the presence of a chloride chlorinating catalyst, at a reaction temperature above the temperature at which said compound is completely substitutively nuclear chlorinated as essentially the only reaction under otherwise identical reaction conditions, said reaction temperature being one not above about 90° C. and at which the reaction proceeds to replace hydrogen with chlorine in the alkyl side chain as essentially the only reaction, and at a pressure to maintain the chlorine in a liquid state at said temperature, venting gaseous hydrogen chloride and chlorine from the reaction mass while maintaining a pressure to keep the chlorine in the liquid state at the temperature maintained, condensing at least a part of the vented gaseous chlorine and returning the condensed liquid chlorine to the reaction zone, and removing uncombined chlorine from the chlorinated compound.

9. A process of substitution chlorination of a chlorine-soluble completely substitutively nuclear chlorinated aromatic compound having at least one alkyl side chain to replace side chain hydrogen with chlorine, which comprises reacting said compound with chlorine in solution in liquid chlorine functioning as a liquid solvent medium for the compound, in the presence of anhydrous ferric chloride as a chlorinating catalyst, at a reaction temperature above the temperature at which said compound is completely substitutively nuclear chlorinated as essentially the only reaction under otherwise identical reaction conditions, said temperature being one not above about 90° C. and at which the reaction proceeds to replace hydrogen with chlorine in the alkyl side chain as essentially the only reaction, and at a pressure to maintain the chlorine in a liquid state at said temperature.

FRANCIS EARL LAWLOR.
MAYNARD B. BRODBECK.

REFERENCES CITED

The following references are of record in the file of this patent:

Schramm, Berichte der Deut. Chem. Gesell., vol. 18, pp. 607–8 (1885).